March 14, 1944.  N. B. STONE  2,344,376
DOOR KNOB
Filed Nov. 13, 1941
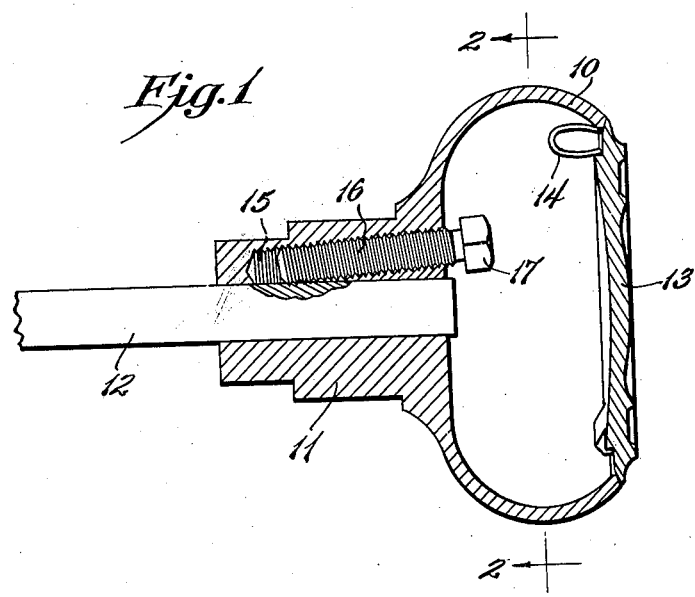
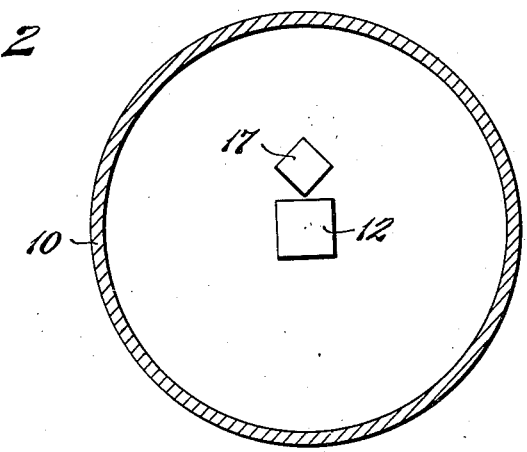
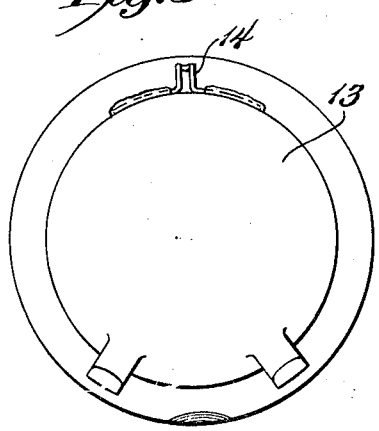
Inventor
N. B. Stone
By A. D. Adams
Attorney Patented Mar. 14, 1944

2,344,376

UNITED STATES PATENT OFFICE 2,344,376

DOORKNOB

Nathaniel B. Stone, Washington, D. C.

Application November 13, 1941, Serial No. 418,965

3 Claims. (Cl. 292—350)

This invention relates to door knobs and, among other objects, aims to provide improved set screw means for securely holding door knobs on operating spindles. More particularly, the invention aims to provide a set screw arranged at an acute angle to the longitudinal axis of a spindle and inserted in a hollow knob near the end of the spindle in an opening at such an aangle to the spindle that some of the endmost threads of the set screw engage and bite into the side of the spindle.

Other aims and advantages of the invention will appear in the specification, when considered in connection with the accompanying drawing, wherein:

Fig. 1 is a sectional view showing one embodiment of the invention;

Fig. 2 is a sectional view taken on the line 2—2 of Fig. 1; and

Fig. 3 is a face view of a closure plate for the hollow knob shown in Fig. 1.

Referring particularly to the drawing, the knob securing means is especially contrived to avoid accidental loosening and slippage on a spindle due to ordinary or rough usage. It is well known that the usual set screws and other fastening means are subjected to rough treatment and loose knobs promote wear and oftentimes result in loosening and breaking the securing means. In this instance, the improved set screw means is shown as applied to an ordinary hollow knob which is usually made of metal. It is shown as comprising a hollow knob portion 10 having the usual hub 11 slipped on a spindle 12. The hub portion 11 is usually solid and the hollow knob may be made in the form of a casting. The hollow shell is shown as having a removable cover plate 13. In this example, the cover plate has spaced lugs and a spring finger 14 adapted to snap in place in the shell opening and the plate can be removed by an ordinary tool, such as a screwdriver or penknife.

Referring to Fig. 1, the hub portion of the knob is shown as having a screw threaded opening 15 extending at an acute angle to and on one side of the spindle. A set screw 16 having a non-circular head 17 is shown as being screwed into the opening so that one or more of the convolutions of the screw threads will engage and bite into the spindle when the set screw is screwed home, thereby holding the knob securely on the spindle and effectively preventing any loosening due to rough usage. The angularity of the set screw with respect to the longitudinal axis of the spindle is preferably such that at least two convolutions of the threads engage the spindle. Moreover, the size of the opening in the knob is sufficiently large to permit the insertion of any ordinary wrench or a pair of pliers for the purpose of tightening or loosening the set screw.

From the foregoing description, it will be seen that the set screw is easily accessible from outside the knob and provides a far more secure fastening between the hub of the knob and spindle than does the ordinary small set screw extending into an opening in the hub of a knob. The knob is insertable on the spindle in any position with respect to the sides of the spindle and can be adjusted longitudinally without reference to any openings or threaded serrations on the edges of the spindle. Also, the knob may be easily removed by removing the cover or bezel plate. Moreover, the set screw is much larger than the ordinary set screws generally used as door knob fastenings and it canot easily be broken. Furthermore, it is concealed from view and cannot easily be tampered with.

Obviously, the present invention is not restricted to the particular embodiment thereof herein shown and described.

What is claimed is:

1. In combination with a hollow door knob of the character described, a removable cover plate in the shell of the knob; a set screw opening in the shank of the knob extending at a small acute angle to the longitudinal axis of the spindle opening; and a set screw in the opening having end threads adapted to engage and bite into the outside, plain surface of a spindle when the knob is adjusted thereon and the screw is tightened.

2. In combination with a door knob comprising a hollow shell having a shank portion adapted to be slipped on an ordinary spindle, a cover plate mounted on the shell; and a set screw extending through the shank portion at a small acute angle to the longitudinal axis of the spindle opening so that a plurality of the end convolutions of the screw threads will engage and bite into one side face of a spindle on which the knob is mounted when the screw is tightened.

3. In combination with a door knob comprising a hollow shell having a shank portion adapted to be slipped on an ordinary spindle, a cover plate removably mounted in the shell; a set screw in the shank portion arranged at a small acute angle to the longitudinal axis of the spindle opening so that a plurality of the screw threads at the end will engage and bite into the spindle as the screw is tightened; and a head on said set screw within the shell on one side of the spindle and accessible for manipulation through the opening for said cover plate.

NATHANIEL B. STONE.